Sept. 20, 1971      G. W. JACKSON      3,606,375

ELECTRIC CONTROLLER FOR VEHICLE LEVELING SYSTEM

Filed Jan. 23, 1970      2 Sheets-Sheet 1

INVENTOR.
George W. Jackson
BY
J.C. Evans
ATTORNEY

Sept. 20, 1971  G. W. JACKSON  3,606,375
ELECTRIC CONTROLLER FOR VEHICLE LEVELING SYSTEM
Filed Jan. 23, 1970  2 Sheets-Sheet 2
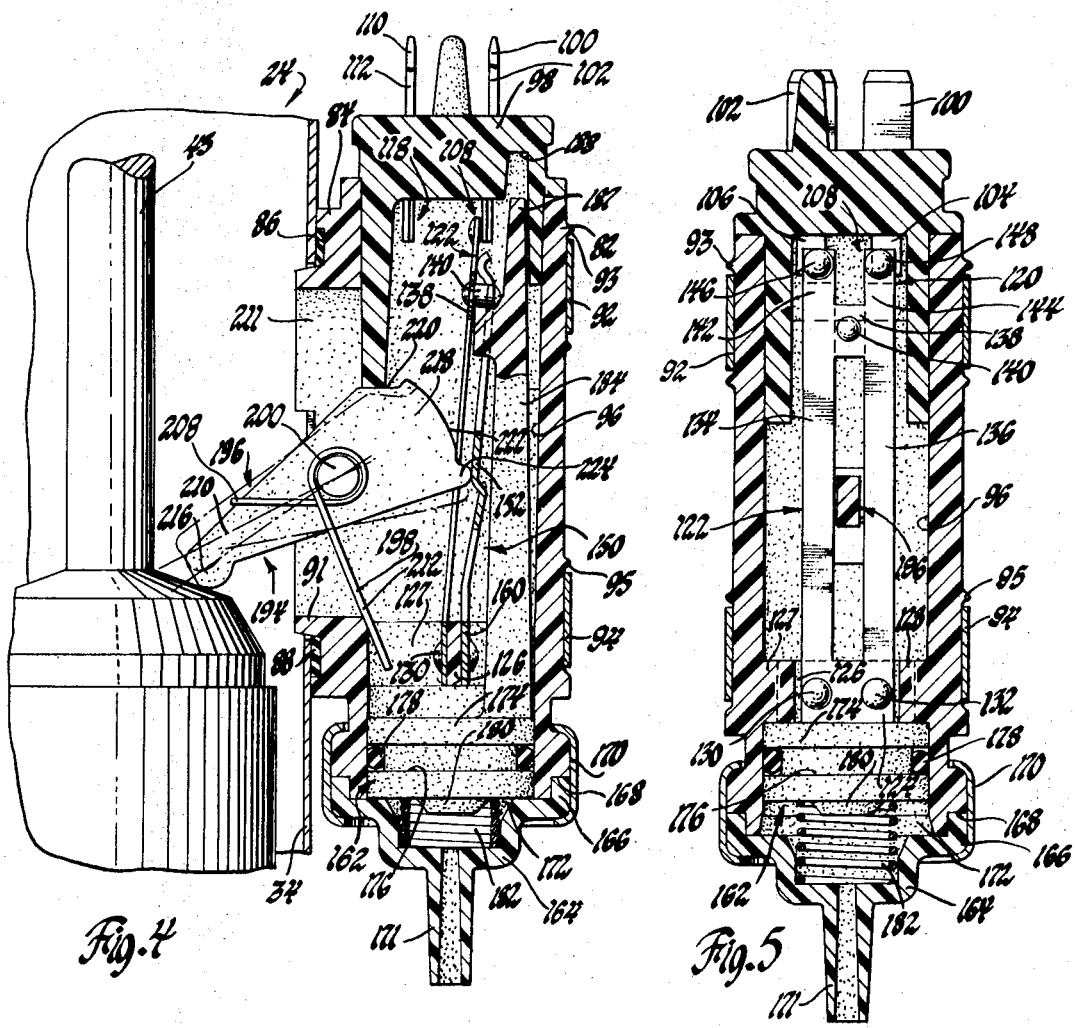
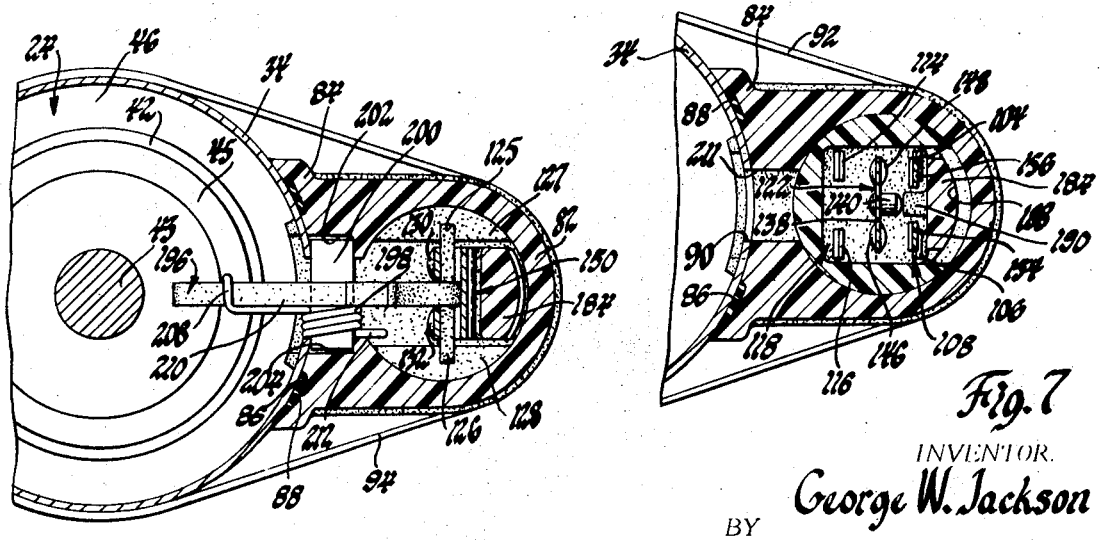
INVENTOR.
George W. Jackson
BY
J.C. Evans
ATTORNEY

United States Patent Office

3,606,375
Patented Sept. 20, 1971

3,606,375
ELECTRIC CONTROLLER FOR VEHICLE LEVELING SYSTEM
George W. Jackson, Dayton, Ohio, assignor to General Motors Corporation, Detroit, Mich.
Filed Jan. 23, 1970, Ser. No. 5,230
Int. Cl. B60g 17/00
U.S. Cl. 280—124                        8 Claims

ABSTRACT OF THE DISCLOSURE

In preferred form, a controller for a vehicle leveling system that has an auxiliary load-supporting air spring for maintaining a vehicle height. An electrical switch is mounted on the air spring and is responsive to the height of the vehicle chassis to selectively control either energization of an electric motor driven compressor to exhaust or pump-down the air spring or energization of a solenoid controlled valve to communicate a storage tank with the air spring during a pump-up or inflation phase of operation. The switch includes a pressure sensing chamber in communication with the air spring and a pressure responsive piston operated by pressure in the air spring to condition the switch to shut-off the compressor.

---

This invention relates to automatic vehicle leveling systems of the type including an electric motor driven compressor and a solenoid controlled valve operative in response to changes in the height relationship between the sprung and unsprung mass of a vehicle for varying pressure in an air spring to maintain the vehicle level and more particularly to an improved electrical controller for selectively energizing these components to direct pressurizable fluid through a conduit connected to an auxiliary load supporting air spring device for maintaining a pressure therein which produces an uplifting force on the chassis of a vehicle which cooperates with the primary suspension spring of the vehicle to maintain a predetermined desired height relationship between the chassis of the vehicle and its ground engaging axle assembly.

In automatic leveling systems, it is desirable to include an electrically operated motor drive compressor therein to maintain a suitable load leveling capacity. Furthermore, it is desirable to include components in association with the electric motor driven compressor which occupy a limited amount of space within an associated vehicle chassis.

In addition to capacity, electric motor driven compressors for leveling systems are desirable in that they have little or no effect on the operation of the vehicle engine.

In selecting a particular type of electrically operated leveling system it is desirable that it be one that includes a minimum of fluid connections between a separate pressurized fluid supply source and an auxiliary load supporting spring component within the system.

An object of the present invention is to provide an improved automatic vehicle leveling system of the type including a high-capacity, electric motor driven compressor and pressure tank serving as a fluid pressure source to an auxiliary load-supporting suspension component by the provision of a compact, electrical controller adapted to be carried by the auxiliary suspension component of the system and responsive to changes in the height condition of the vehicle to control either the energization of the electric motor or the energization of an electrically energizable solenoid valve to regulate fluid flow through a single conduit communicating the pressure source with the fluid spring means and wherein the controller includes pressure responsive cut-off means for terminating compressor operation following an exhaust phase of operation.

A further object of the present invention is to provide an improved electrical controller for operating an electric motor driven compressor in an automatic leveling system and including means for operating a second electrically energizable component in the leveling system and means for sensing a predetermined minimum pressure within a fluid spring device to disconnect all electrical components of the system from a power source.

Still another object of the present invention is to provide an improved combination auxiliary load-supporting fluid spring means and electrical switch combination for controlling the operation of electrical components for filling and exhausting the fluid spring means wherein the spring means includes a rigid tubular portion having a side port therein which receives a side port of a switch housing which communicates with a cylindrical opening through the switch housing; and wherein first and second switch means are supported on the switch housing in a normally open position and operated to a closed position by a movable element that is positioned by a cam element having a portion thereof extending through the side port of the switch housing into engagement with a relatively moving portion of the auxiliary load-carrying fluid spring means; and wherein means are provided separately of the cam element to position the movable element to cause both said first and second switch means to be opened when a minimum pressure condition exists within the spring means.

Yet another object of the present invention is to provide a shock absorber and fluid spring unit in combination with an electrical controller that is supported on a rigid member of the fluid spring to one side thereof and includes a switch operator cam extending interiorly of the fluid spring for engaging a portion thereof to detect the height relationship of a vehicle chassis with respect to its suspension assembly to position a switch into a plurality of operative positions and wherein means are associated with the switch for sensing the pressure condition within the fluid spring to condition the switch to disconnect all electrical components of a leveling system from a power source.

These and other objects of the present invention are attained in one working embodiment that includes a pair of combination shock absorber-fluid spring suspension units connected between the vehicle chassis and the rear axle assembly at either side thereof. The pressure source for each of the fluid springs includes a storage tank having an outlet under the control of an electrically energized solenoid valve which communicates with a common conduit to the fluid springs. Within the storage tank is located an electrically motor driven compressor having its inlet connected to a one-way check valve, thence through common conduit in communication with the fluid springs. The outlet of the compressor discharges directly into the storage tank. An electrical controller is fastened to the exterior of a dust tube on one of the fluid springs and includes a first normally open pair of contacts that electrically connects the power source to the solenoid operated valve and a second normally open pair of contacts that electrically connect the power source with the drive motor for the compressor. A movable contact carrying arm is selectively positioned with respect to the first and second pairs of contacts for bridging them to electrically connect either the solenoid operated valve or the motor to the power source to either produce a pump-up or exhaust phase of operation in the leveling system.

The electrical controller includes a cam operator for the movable contact carrying arm that has a finger portion directed interiorly of the fluid spring to engage a relatively movable portion thereof so as to sense the relative height relationship between the vehicle chassis and its rear suspension. The switch further includes a pressurized chamber that is in direct communication with the fluid spring and means responsive to the pressure within the chamber to locate the movable contact carrying arm with respect to the normally open pairs of contacts to maintain a minimum pressure retention within the fluid spring following an exhaust phase of operation.

Further objects and advantages of the present invention will be apparent from the following description, reference being had to the accompanying drawings wherein a preferred embodiment of the present invention is clearly shown.

In the drawings:

FIG. 4 is a view like FIG. 3 showing the operative position of controller switch components during and immediately following an exhaust phase of operation;

FIG. 5 is a vertical sectional view taken along the line 5—5 of FIG. 3 looking in the direction of the arrow;

FIG. 6 is a horizontal sectional view taken along the line 6—6 of FIG. 3 looking in the direction or the arrows; and FIG. 7 is a horizontal sectional view taken along the line 7—7 of FIG. 3 looking in the direction of the arrows.

Figure 1:
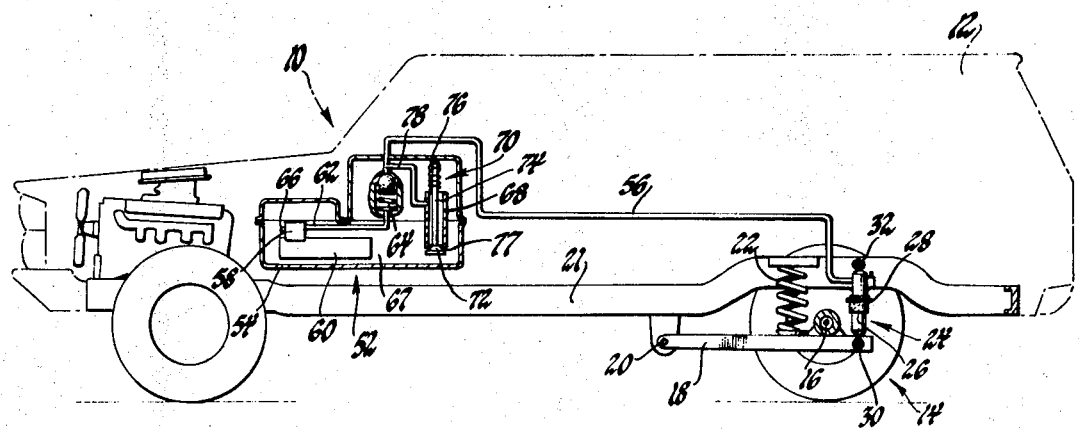
FIG. 1 is a diagrammatic view of a vehicle including a leveling system of the present invention.

Referring now to FIG. 1, a vehicle 10 is illustrated including a chassis 12 having a rear suspension assembly 14 with an axle housing 16.

A control arm 18 is rigidly secured to the right rear end of axle housing 16 and includes one end thereof connected by a pivot pin 20 to a side frame member 21 of the chassis 12. A like control arm (not shown) is connected to the opposite end of the axle housing and the other side frame member in a like manner.

The chassis 12 is supported at the right side of rear suspension assembly 14 by a primary coil suspension spring 22 that has one end thereof supported by the control arm 18 intermediate the pivot pin 20 and the axle housing 16 and the opposite end thereof supportingly received by a plate on the side frame member 21. A left rear coil suspension spring, like 22, is supported in a like fashion between the control arm and the side frame on the opposite side of the car.

Auxiliary load supporting devices 24, 25 are provided, one adjacent each of the primary suspension springs to level the rear end of the chassis 12 with respect to the axle housing 16 by maintaining a predetermined height relationship therebetween.

More particularly, the auxiliary load supporting device 24 is representatively illustrated as being a shock absorber 26 in combination with a fluid spring 28.

The bottom end mount 30 of the shock absorber 26 is pivotally connected to the rearmost end of the control arm 18 and a top end mount 32 on the air spring 28 is pivotally connected to the frame of the chassis 12.

Figures 2, 3:
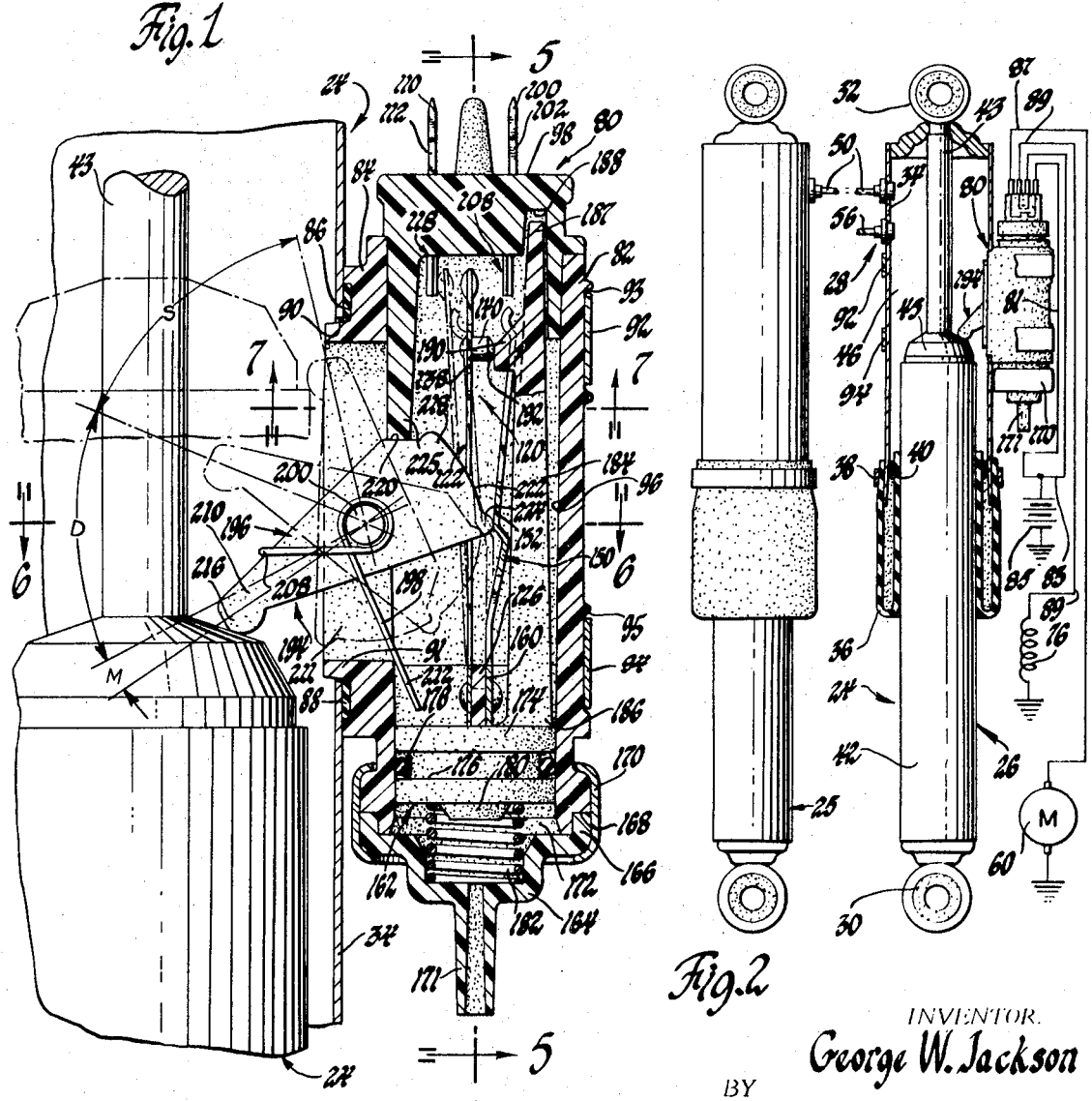
FIG. 2 is a diagrammatic view of a pair of combination shock absorber and fluid spring units in association with an electrical control circuit for regulating the component parts of the leveling ssytem during different phases of operation.
FIG. 3 is an enlarged, vertical sectional view of an improved electrical controller is association with a fragmentary portion of the combination shock absorber and fluid spring unit.

As more particularly illustrated in FIG. 2, the fluid spring 28 includes a rigid, cylindrical dust tube 34 that is fastened at its upper end to the top end mount 32. A flexible rubber sleeve 36 is rolled on itself and has one end thereof secured by a clamp ring 38 to the lower open end of the dust tube 34. The opposite end of the sleeve 36 is secured by a clamp ring 40 to the outer cylinder 42 of the shock absorber 26 intermediate the ends thereof.

The shock absorber also includes a piston rod 43 directed exteriorly of the cylinder 42 through a top closure member 45.

Together, the top closure member 45, the cylinder 42, the flexible rubber sleeve 36, the dust tube 34 and the top mount assembly 32 coact to define a variable volume pressurizable chamber 46 having a predetermined fluid pressure therein necessary to produce the aforementioned leveling action.

The auxiliary load carrying device 25 is identical to the previously described device 24. It is mounted on the left side of the vehicle between the end of the left control arm and the chassis frame to supplement the primary load carrying capacity of the coil spring on that side of the vehicle.

A cross over tube 50 is connected between the pressurizable chamber 46 and device 25 to produce a balanced pressure between the two units.

A pressure fluid suply system 52 is preferably located within the engine compartment at a point accessible under the hood.

A hermetically sealed storage tank 54 of the supply 52 is connected through a common supply and exhaust conduit 56 to the chamber 46.

A compressor 58 is located within the interior of the tank 54 and is driven by an electrical motor 60 during an exhaust or pump-down phase of operation to be described.

The compressor 58 includes an inlet 62 which is connected through a one-way ball check valve 64 to the conduit 56 whereby during the pump-down period of operation air flows from the conduit 56 across the check valve 64 through the inlet 62 and is thence discharged through a compressor outlet 66 into the interior 67 of the tank. The check valve 64 prevents back flow of pressurized fluid from the tank 54 through the compressor 58 into the common conduit 56 when the compressor is off.

A tank outlet 68 is in communication with the interior 67. It is opened and closed by a solenoid operated valve assembly 70 that includes a valving element 72 on one end of a movable armature 74 which is under the control of an electrically energizable coil 76.

When the coil 76 is deenergized, the valving element 72 is biased by spring means (not shown) into engagement with a seat 77 to block communication between the tank interior 67 and a cross-over connection 78 between the tank outlet 68 and the common exhaust and supply conduit 56 to the pressurizable chambers 46 of the auxiliarly load supporting devices 25, 26.

Thus, the fluid supply system 52 has two electrically energizable components including the electric motor 60 and the electrically energized coil 76 of the solenoid valve assembly 70.

With reference to the schematic electrical diagram in FIG. 2, an improved electrical controller or switch assembly 80 is shown that selectively energizes the coil 76 and motor 60 to produce different phases of operation in the leveling system.

More particularly, the controller 80 is electrically connected by conductors 81, 83 to the positive terminal of a vehicle battery 85. An electrical conductor 87 connects the assembly 80 to one side of the electric motor 60 which has the opposite side thereof connected to ground and an electrical conductor 89 connects the assembly 80 to one end of the coil 76 which has its opposite end connected to ground.

The electrical control assembly 80 more particularly includes a generally cylindrical plastic body or housing 82 which has a side extension 84 including a peripheral groove 86 thereon in which is seated an annular gasket 88 held in sealing engagement between the side extension and the outer surface of the dust tube 34 around a side opening 90 therein to seal between a peripheral flange 91 on the extension 84 and the dust tube 34.

In the illustrated arrangement, the housing 82 is held in place to one side of the device 26 by a pair of spaced clamp rings 92, 94 that extend completely around the outer periphery of the dust tube 34 and back around the outer surface of the housing in recesses 93, 95 formed at either end thereof.

A cylindrical bore 96 is directed through the housing 82 and is closed at one end thereof by a terminal plug 98.

The terminal plug 98 includes a pair of spaced apart motor terminals 100, 102 configured as spades that extend through the terminal plug 98 interiorly of the bore 96 to define a pair of spaced apart motor contacts 104, 106 on the ends of the terminals 100, 102 respectively.

The contacts 104, 106 constitute open circuit components of a first switch means 108 in the assembly 80.

Additionally, a pair of spaced apart solenoid terminals 110, 112 are likewise directed through the terminal plug 98 to define spaced apart solenoid contacts 114, 116 on the inner ends of the terminals 110, 112 respectively.

The normally open contacts 114, 116 together constitute a second normally open switch 118 in the assembly 80.

In the illustrated preferred embodiment of the invention the first and second switch means 108, 118 are selectively bridged by a movable switch operating assembly 120 that has a H configured spring arm 122 with a bight portion 124 connected to one side of an electrical insulation bridge 126 which press fits in a cross slot 125 between shoulder 127, 128 on the housing that extend inwardly of the cylindrical bore 96 at either side thereof.

More particularly, the bight portion connection to bridge 126 is provided by a pair of spaced apart rivets 130, 132 and the spring arm 122 is configured to be biased in a rightward direction as viewed in FIGS. 3 and 4 so as to cause a pair of spaced legs 134, 136 thereon to move toward the spaced apart motor contacts 104, 106.

The legs 134, 136 are joined by a cross piece 138 which has a follower element 140 fixedly secured thereto to extend in the direction of those same contacts.

End extensions 142, 144 on the legs 134, 136 respectively carry movable contacts 146, 148. When the contacts 146, 148 on the movable spring arm 122 engage either one of the normally open switch means 108, 118 a bridge path is defined by the spaced movable contacts 146, 148 through the extension 142, 144 and through the cross piece 138 to complete a circuit from the vehicle battery 85 to either the solenoid coil 76 or the electric motor 60 for driving the compressor.

In accordance with the invention the normally open switch means can take the form of normally open reed switches. In this case the switch operating arm 122 would utilize magnet means to control closure of the switches rather than the aforedescribed bridging contacts 146, 148. Other equivalent forms of normally open switches operable by a movable arm are of equal suitability.

Additionally, the controller 80 includes a spring-biased pusher 150 that is located to one side of the movable spring arm 122. More particularly, it includes an offset midsection 152 that joins spaced apart legs 154, 156 each of which immediately underlies one of the spaced apart legs 134, 136 of the spring biased arm 122. The legs 154, 156 are joined at their bottom by a bight portion 160 that is fixedly secured to the bridge 126 by the same rivets 130, 132 that fasten the bight portion 124 of the spring arm 122 in place.

In the illustrated arrangement, the pusher 150 is made of spring steel and is biased in a direction opposite to that of the bias of the spring arm 122 thereby to cause it to move in a leftward direction as viewed in FIG. 2 when the pusher 150 engages arm 122.

In accordance with certain principles of the present invention, the assembly 80 further includes a minimum pressure retention device 162 that includes a vent cap 164 having an axially directed peripheral flange 166 thereon which is sealingly connected to a stepped shoulder 168 on the bottom of the housing 82 by a ring clamp 170.

The cap 164 includes a tubular extension 171 thereon to atmosphere which communicates with a vent chamber 172 defined by the vent cap 164 and a lower portion of the cylindrical bore 96 which is located beneath the shoulders 127, 128.

More particularly, the vent chambers 172 has its upper end closed by a movable pressure sensing piston 174 that is slidably supported by the peripheral wall of the bore 96. A peripheral groove 176 in the piston supportingly receives an O ring 178 that seals the vent chamber 172 from the space defined by the cylindrical bore 96 which is on the opposite side of the piston 174.

A downwardly depending center guide 180 on the underside of piston 174 is directed into one end of a coil spring 182 which spring biases the piston 174 interiorly of the cavity 96.

Thus, an elongated tapered extension 184 that has a thickened root portion 186 thereon integrally formed with the upper face of the piston 174 is forced in a direction to slidably locate the upper end 187 thereof within a slot 188 formed to one side of the terminal plug 98.

This coaction between the upper end 187 and the slot 188 serves to axially guide a ramp 190 on the extension 184 with respect to the follower 140 and to align a flat upper surface 192 on the ramp 190 with the follower 140 when a predetermined minimum fluid pressure occurs within the cavity 96 as will be discussed.

Additionally, the controller 80 includes an operator 194 including a cam 196 and a torsion spring 198. The cam 196 includes a transverse shaft 200 having the opposite ends thereof supportingly received in generally circular recesses 202, 204 formed in the housing 82 on opposite sides thereof. Each of the recesses 202, 204 are opened to the side and the shaft 200 is retained in place by a locking portion 206 of the dust tube or shield 34 which extends on each side of the opening 90 therethrough.

The spring 198 includes a coil portion that is wrapped around one side of the shaft 200 and a bent end 208 which fits over a cam finger 210 that extends through the opening 90 and a side passageway 211 in the housing 82 which communicates the pressurizable chambers 46 with the cylindrical cavity 96. An opposite straight end 212 of the spring 198 is directed interiorly of the cavity through the passageway 211 to abut against the housing as is best illustrated in FIGS. 3 and 4 thereby to cause the cam 194 to be continuously biased in a counterclockwise direction, as viewed in FIGS. 3 and 4, between a plurality of operative positions to be discussed.

The operating cam includes a wedge-configured base 218 that is located within the cylindrical bore 96. It has a stepped shoulder 220 on its periphery which merges with an arcuate segment 222 that finally terminates in a rounded tip 224 that is operatively engageable with the offset mid-section 152 of the pusher 150.

In FIG. 3, the cam 194 is shown in a solid line position in its most counter-clockwise position as established by engagement of shoulder 220 with a stop 225 on terminal plug 98. At this point the rounded tip 224 on the cam operator 194 is in engagement with the mid-section 152 at the high point thereon so as to position the pusher 150 toward the right of the cavity 96 in a position out of the way of the spring arm 122. The spring arm 122, being biased to the right, is thereby free to assume a first operative position wherein the movable contacts 146, 148 are in engagement with the motor contacts 104, 106 to condition the normally open switch 108 defined thereby to energize the motor 60 for a pump-down phase of operation.

When the cam operator 194 is in the intermediate dotted line position shown in FIG. 3, the transition between the arcuate end surface 222 and the stepped shoulder 220 is positioned to be located on the low side of the mid-section 152. This locates the pusher 152 in the dotted line position shown in FIG. 3 where it is spring-biased against the right side of the movable spring arm 122 so as to maintain the spaced contacts 146, 148 thereon out of engagement with the motor contacts and in bridging contact with the solenoid contacts 114, 116 to thereby condition the first normally open switch means 108 to cause the solenoid operated valve 70 to be energized during a pump-up phase of operation.

In this position, the biased spring arm 122 is held closed by the pusher 152 since the pusher 152 has a greater spring bias in the left direction than does the spring arm 122 in the right direction. The relative spring bias of these respective elements is controlled to produce a desired contact pressure in the order of two ounces minimum per contact; at the initial point of contact which is established when the cam 194 is in the intermediate dotted line position.

During a period when the vehicle is heavily loaded to cause a maximum deflection in the primary suspension springs 22 the end mounts 32, 30 of the auxiliary load supporting devices 24, 25 are pushed together so as to cause the top closure 45 of each shock absorber 26 to be moved into the dotted line position shown in FIG. 3 wherein the rounded end 216 of the finger 210 is moved partially within the passageway 211.

At this time the wedge configured base 218 is moved in a direction outwardly of the passageway 211 to locate the arcuate surface 222 and the shoulder 220 thereon completely out of engagement with the mid-section of the follower or pusher 150. This constitutes an overtravel mechanism within the switching device to prevent a heavy overload condition from causing damage to any of the operative components of the electrical controller when the vehicle is overloaded.

In addition to the above-described first and second operative positions of the movable spring arm 122 there is a third operative position that occurs when the minimum pressure retention is cut-off assembly 162 senses a minimum pressure within the pressurizable chambers 46 of the auxiliary load supporting devices 24, 25. More particularly, when the pressure within the air chambers 46 falls below a predetermined minimum level in the order of 10 to 15 p.s.i.g., the total effect of pressure force on the upper surface of the piston 174 is less than the opposed force of the coil spring 182 and atmospheric pressure on the opposite end of the piston 174 thereby causing it to move interiorly of the cylindrical bore 96 until its upper surface engages the underside of the housing shoulders 127, 128 as is illustrated in FIG. 3.

When this occurs, the tapered extension 184 has the ramp 190 located thereon in alignment with the follower 140 where it engages the flat surface 192. This spaces the contacts 146, 148 on the movable switch operating assembly 120 out of engagement with the motor contacts 104, 106 during periods where the cam 194 is in the illustrated solid line position of FIGS. 3 and 4 where it holds the pusher 150 out of the way and to one side of the spring arm 122.

Thus, the ramp 190 and surface 192 serve as a lock-out to turn off the compressor at the end of an exhaust phase of operation at the point a minimum pressure is present in the air springs 46. This is desirable since the minimum pressure maintains the walls of the inflatable flexible sleeve component 36 of the load supporting devices separated to prevent abrasion therebetween and between that component and other portions of the spring devices during relative movements between the end mount portions thereof.

As indicated above, the leveling system includes a first electrically energizable component represented by the electrical motor 60 that drives the compressor and a second electrical component represented by the energizable coil 76 of the solenoid operated valve 70 that controls the flow of pressurized fluid from the storage tank 54.

When the vehicle is initially loaded in a manner to cause the chassis 12 to move from a predetermined height relationship or curb height, the coil springs 22 will deflect and the auxiliary load supporting devices 24, 25 have the top and bottom end mounts 32, 30 moved toward one another. This causes the piston rod 43 to move interiorly of the shock absorber cylinder 42 until the top closure cap 45 thereon moves against the rounded end 216 of the cam 194 to shift it into the intermediate dotted line position of FIG. 3. The movable contacts 146, 148 assume their bridging relationship with respect to the solenoid contacts 114, 116.

At this point and with reference to FIG. 2, a first energization circuit is completed from the positive terminal of the vehicle battery 85 thence through conductor 81 which is electrically connected to the spade terminal 110 to solenoid contact 114 through the previously described bridging circuit of the switch operating assembly 120 to the contact 116 thence to the spade terminal 112 that is electrically connected to one end of the conductor 89 which has the opposite end thereof connected to the coil 76 thence to ground.

When the coil 76 is energized, it causes the armature 74 to shift the valving element 72 away from the seat 77 and thereby cause a predetermined charge of pressurized fluid to pass through the tank outlet 68 thence to the crossover 78 to the common exhaust-and-supply line 56 which directs the predetermined volume of pressurized fluid into the variable volume pressurizable chambers 46 of the supplemental load support devices 24, 25. A resultant uplifting force is produced between the bottom mount 30 and the top mount 32 of each of these units which raises the chassis 12 with respect to the rear suspension assembly 14. This causes the piston rod 43 to move exteriorly of the cylinder 42 and the spring biased cam operator 194 will thereby be moved from either the top dotted line or the intermediate dotted line position shown in FIG. 3 toward the solid line position shown therein.

As soon as the cam 194 moves counterclockwise from the intermediate dotted line position in FIG. 3, the arcuate surface 222 moves from the lower portion of the mid-section 152 of the follower to the upper portion thereof and this causes the movable contacts 146, 148 to move from their bridging relationship with respect to the solenoid contacts 114, 116. At this point, the vehicle has attained its desired predetermined height relationship and the solenoid operated valve 70 is deenergized to close communication between the tank interior 67 and the pressurizable fluid chambers 46.

The next phase of operation requires a change in the loading of the vehicle. Assuming that the vehicle is unloaded following the pump-up phase of operation described above, the primary suspension springs 22 will raise the chassis 12 away from the rear suspension assembly 14 and this will cause the top mount 32 to move upwardly of the bottom mount 30 with the piston rod 43 moving exteriorly of the shock absorber cylinder 42. The dust tube 34 and top closure 45 are then moved apart from one another causing the rounded end 216 to move in a counterclockwise direction around the biasing action of spring 198 to the dotted line position shown in FIG. 4 which represents the initial point of motor contact closure following dead band movement from the last point of solenoid closure which is that position shown in the intermediate dotted line position of FIG. 3.

At any place throughout the aforedescribed dead range the electrical components of the system are maintained deenergized and the pressurizable chambers 46 are maintained at a pressure that is required to produce a predetermined height relationship between the chassis 12 and the associated ground engaging suspension assembly of the vehicle.

Once the chassis 12 is raised above the rear axle housing 16 an amount to shift the cam 194 into the dotted line position shown in FIG. 4, the movable contacts 146, 148 on the switch operating assembly 120 are located in engagement with the spaced apart normally open, switch means 108 represented by the motor contacts 104, 106. At this point a second electrical circuit is completed as illustrated in FIG. 2 from the positive terminal of battery 85 thence through the conductor 83 to the spade terminal 100 electrically connected to the contact 104 thence through the bridging component portions of the assembly 120 to the other fixed motor contact 106 and the spade terminal 102 that is electrically connected to the conductor 87 which has the opposite end thereof electrically connected to one side of the drive motor 60 having the opposite end thereof connected to ground.

Concurrently, the solenoid valve 70 is conditioned to maintain the outlet 68 closed. When the motor 60 is energized the compressor 58 is driven to pump-down the pressurizable air springs 46 through the line 56 thence across the one-way check valve 64 to the compressor inlet 62. The exhausted or pump-down fluid is discharged through the compressor outlet 66 into the interior 67 of the tank 54 where it is stored for future use in a subsequent pump-up or leveling phase of operation.

Following a predetermined pump-down or exhaust phase, the pressure within the chamber 46 is reduced to a point where the reduced load on the chassis 12 will be balanced by the uplifting action of the combined primary suspension springs 22 and the auxiliary load supporting devices 24, 25 at which time the piston rod 43 will move interiorly of the shock absorber cylinder 42.

A third operative cut-out phase occurs at the end of the exhaust operation when the chambers 46 are pumped down to a pressure level in the order of 10 to 15 p.s.i. The pressure sensing piston 174 is moved from the position shown in FIG. 4 by the spring 182 into the position shown in FIG. 3 wherein the follower 140 on the movable spring arm or switch operating component 120 will move upwardly on the ramp 192, be supported by the flat surface 192 thereby to space the movable contacts 146, 148 from the motor contacts and thus cut-off compressor operation before the chambers are completely exhausted for the reasons stated above.

The illustrated working embodiment includes electrical and mechanical components with the following ratings:

| Component: | Rating: |
| --- | --- |
| Fuid spring 28 | 10 p.s.i.g. to 125 p.s.i.g. |
| Motor 60 | 7 amp. average at 12 volts |
| Compressor 58 | displacement—.077 cu. in. |
| Spring 182 | 18 lbs. per inch |

Angles S and M in FIG. 3 represent the arcuate travel of cam 194 in which the solenoid contacts and motor contacts are closed respectively. The angle D represents the dead band travel of spring arm 122 where none of the contacts are closed.

The limited amount of motor contact travel of cam 194 is due to the minimum pressure retention subassembly 162 which assures that the contacts will be positively opened immediately on the occurrence of a minimum pressure condition within the pressure chambers 46 rather than depending upon a closely calibrated switch operating system that requires arcuate and careful alignment on a particular dust tube for operation with respect to a particular shock absorber assembly.

While the embodiments of the present invention, as herein disclosed, constitute a preferred form, it is to be understood that other forms might be adopted.

What is claimed is:

1. An automatic vehicle load leveling system having a first member adapted to be connected to the sprung mass of a vehicle, a second member adapted to be connected to the unsprung mass of the vehicle, leveling spring means including said first and second members for forming a pressurizable fluid spring chamber, a switch housing having a cylindrical opening therethrough, means communicating said pressurizable fluid spring chamber with said opening, a cam member pivotally supported by said switch housing including an elongated finger directed interiorly of said pressurizable spring chamber, means for spring biasing said finger interiorly of said chamber into engagement with one of said mass connected members for detecting relative movement therebetween, a movable contact carrying arm located within said switch housing having a portion thereon engageable with the said cam member to be positioned by said cam member in first, second and third operative positions, first circuit means including an electrically energizable compressor for pumping down said spring chamber during an exhaust phase of operation when said arm is in said first position, second circuit means including an electrically energizable solenoid operated valve means for communicating a high pressure reservoir with said spring chamber during a pump-up phase of operation when said arm is in said second position, and means operative to move said contact carrying arm into said third position to deenergize said compressor when a predetermined minimum pressure condition exists within said pressurizable chamber of said leveling spring means.

2. An automatic vehicle leveling system including an auxiliary fluid spring with a first portion adapted to be connected to a sprung mass and a second portion adapted to be connected to an unsprung mass, means including said first and second portions for defining a pressurizable variable volume spring chamber, a common supply and exhaust conduit directly connected to said chamber at a single fitting, a pressurized storage tank, means including an electrically energizable solenoid operated valve connected to said common conduit for communicating the interior of said storage tank with the interior of said fluid spring means, electrical control means conditioning said valve to direct high pressure fluid from said tank to said spring for pressurizing it during a pump-up phase of operation, an electric motor driven compressor having an inlet and outlet, said outlet in communication with said storage tank, means including a one-way check valve communicating said common conduit with the inlet of said compressor to prevent back flow of fluid from said tank through said compressor into said common conduit when said compressor is off, said control means conditioning said electric motor driven compressor to pump fluid from said spring into said tank while conditioning said solenoid valve to block fluid flow from said tank to said common conduit during a pump-down or exhaust phase of operation wherein the fluid spring device is deflated.

3. In combination, a vehicle load leveling device having a first member adapted to be connected to the sprung mass of a vehicle, a second member adapted to be connected to the unsprung mass of the vehicle, leveling spring means including said first and second members for forming a pressurizable fluid spring chamber, a switch housing having a cylindrical opening therethrough, means communicating said pressurizable fluid spring chamber with said opening, a cam member pivotally supported by said switch housing including an elongated finger directed interiorly of said pressurizable spring chamber, means for spring biasing said finger interiorly of said chamber into engagement with one of said mass connected members for detecting relative movement therebetween, a movable contact carrying arm located within said switch housing having a portion theeron engageable with the said cam member to be positioned by said cam member in first, second and third operative positions, first circuit means including an electrically energizable compressor for pumping down said spring chamber during an exhaust phase of operation when said arm is in said first position, second circuit means including an electrically energizable solenoid operated valve means for communicating a high pressure reservoir with said spring chamber during a pump-up phase of operation when said arm is in said second position, cut-off means operative to move said contact carrying arm into said third position to deenergize said compressor when a predetermined minimum pressure condition exists within said pressurizable chamber of said leveling spring means, said cut-off means including a piston slidingly, sealingly supported within said cylindrical housing opening, means including a vent opening for forming a vented chamber on one side of said piston, the opposite side of said piston being exposed to the pressure within the said spring chamber.

4. In combination, a vehicle load leveling device having a first member adapted to be connected to the sprung mass of a vehicle, a second member adapted to be connected to the unsprung mass of the vehicle, leveling spring means including said first and second members for forming a pressurizable fluid spring chamber, a switch housing having a cylindrical opening therethrough, means communicating said pressurizable fluid spring chamber with said opening, a cam member pivotally supported by said switch housing including an elongated finger directed interiorly of said pressurizable spring chamber, means for spring biasing said finger interiorly of said chamber into engagement with one of said mass connected members for detecting relative movement therebetween, a movable contact carrying arm located with said switch housing having a portion thereon engageable with the said cam member to be positioned by said cam member in first, second and third operative positions, first circuit means including an electrically energizable compressor for pumping down said spring chamber during an exhaust phase of operation when said arm is in said first position, second circuit means including an electrically energizable solenoid operated valve means for communicating a high pressure reservoir with said spring chamber during a pump-up phase of operation when said arm is in said second position, cut-off means operative to move said contact carrying arm into said third position to deenergize said compressor when a predetermined minimum pressure condition exists within said pressurizable chamber of said leveling spring means, said cut-off means including a piston member slidingly, sealingly supported within said cylindrical housing opening, means including a vent opening for forming a vented chamber on one side of said piston, the opposite side of said piston being exposed to the pressure within the said spring chamber, an extension on said piston directed through said housing having a portion thereof engageable with said movable contact carrying arm when the pressure within said reaches a predetermined minimum value to shift it into said third position.

5. An electrical controller for operating first and second electrically energizable devices in an automatic leveling system for a vehicle comprising, a switch housing having a cylindrical opening therein and a side port therefrom for communication with the interior of a fluid spring leveling means, a movable contact carrying spring arm located within said cylindrical opening, a terminal plug on said switch housing including a first and a second pair of fixed contacts, a cam for operating said movable contact carrying arm, means for pivotally connecting said cam to said housing, said cam including an elongated finger portion extending outwardly of said side port for engagement with a movable portion of the fluid spring leveling means, means for biasing said finger continuously outwardly of said side port, a base portion on said cam, a switch arm pusher normally spring biased into engagement with said movable contact carrying spring arm and engageable with said base portion to position said movable contact carrying spring arm in a first position in engagement with one of said pairs of fixed contacts to complete an energization circuit for one of the electrically energizable devices, said arcuate surface on said cam and said follower cooperating to locate said movable contact carrying arm in a second position in engagement with said second pair of contacts for completing an energization circuit for the other of the electrically energizable devices, means including a cut-off piston responsive to a predetermined minimum pressure within said switch housing to locate said arm movable contact carrying out of engagement with said second pair of contacts to deenergize the other device.

6. An electrical controller for operating first and second electrically energizable devices in an automatic leveling system for a vehicle having a fluid spring comprising, a switch housing including a cylindrical opening therethrough and a side port for communication with the fluid spring, a first normally open switch and a second normally open switch within said switch housing, movable switching means within said switch housing having a first position for operating said first switch and a second position for operating said second switch, a cam element pivotally secured to said housing having a finger portion thereon directed through said port for operation by the fluid spring, means for biasing said finger against one portion of said fluid spring, said cam including a base portion thereon located within said cylindrical opening and engageable with said movable switching means to control its relationship with respect to said first and second switch means, said cam operating to locate said switching means in a position to close said first switch during a pump-up phase of operation, said cam positioning said switching means to operate said second switch during an exhaust phase of operation, and means responsive to a predetermined minimum pressure within the fluid spring to position the switching means to open both switches following a predetermined exhaust phase of operation.

7. An electrical controller for operating first and second electrically energizable devices in an automatic leveling system for a vehicle comprising, a housing having a cylindrical opening therethrough, a terminal plug closing one end of said housing, a first pair of fixed contacts on said terminal plug, a second pair of fixed contacts on said terminal plug, a movable contact carrying spring arm having one end fixedly secured adjacent one end of said housing and having the opposite end thereof movable with respect to said first and second pairs of contacts, a pair of contacts on said movable contact carrying arm engageable with said first and second pairs of contacts to complete a circuit thereacross, an elongated spring-biased pusher element located in spaced parallelism with said contact carrying arm and being normally engageable therewith to bias said contact carrying arm in the direction of one of said pair of said fixed contacts, a side port in said housing, a cam pivotally supported on said housing within said side port including a finger directed exteriorly of said side port, spring means for biasing said finger in a direction exteriorly of said side port, said cam including an arcuate segment thereon engageable with said pusher element and operable to position said pusher element in or out of engagement with said contact carrying arm, said pusher element and said cam cooperating to maintain said movable contacts in engagement with said first pair of fixed contacts during a first operation, said cam and said pusher element cooperating to locate said movable contacts in engagement with said second fixed pair of contacts during a second operation, a follower on said movable contact carrying arm, cut-off means independent of said pusher element operative in response to a predetermined minimum pressure within said cylindrical opening to engage said follower to position said movable contacts in spaced relationship to said first and second pairs of fixed contacts when in a third operative position.

8. An electrical controller for operating first and second electrically energizable devices in an automatic leveling system for a vehicle comprising, a housing having a cylindrical opening therethrough, a terminal plug closing one end of said housing, a first pair of fixed contacts on said terminal plug, a second pair of fixed contacts on said terminal plug, a movable contact carrying spring arm having one end fixedly secured adjacent one end of said housing and having the opposite end thereof movable with respect to said first and second pairs of contacts, a pair of contacts on said movable contact carrying arm engageable with said first and second pairs of contacts to complete a circuit thereacross, an elongated spring biased pusher element located in spaced parallelism with said contact carrying arm and being normally engageable therewith to bias said contact carrying arm in the direction of one of said pair of fixed contacts, a side port in said housing, a cam pivotally supported on said housing within said side port including a finger directed exteriorly of said side port, spring means for biasing said finger in a direction exteriorly of said side port, said cam including an arcuate segment thereon engageable with said pusher element and operable to position said pusher element in or out of engagement with said contact carrying arm, said pusher element and said cam cooperating to maintain said movable contacts in engagement with said first pair of fixed contacts during a first operation, said cam and said pusher element cooperating to locate said movable contacts in engagement with said second fixed pair of contacts during a second operation, a follower on said movable contact carrying arm, cutoff means independent of said pusher element operative in response to a predetermined minimum pressure within said cylindrical opening to engage said follower to position said movable contacts in spaced relationship to said first and second pairs of fixed contacts when in a third operative position, said minimum pressure cut-off means including a vent cap closing the opposite end of said cylindrical opening and including a passageway to atmosphere, a piston slideably, sealingly received within said cylindrical opening cooperating with said vent cap to define a vent chamber, said piston including a face exposed to a positive pressure in said housing to force said piston out of said opening, spring means within said vent chamber for biasing said piston interiorly of said housing, and an extension on said piston including an inclined shoulder movable with respect to said follower and engageable therewith when a minimum pressure acts on said face to locate said movable contacts in the third operative position.

References Cited

UNITED STATES PATENTS

| | | | |
|---|---|---|---|
| 3,120,962 | 2/1964 | Long | 280—6 |
| 3,006,657 | 10/1961 | Augustin | 280—124 |

PHILIP GOODMAN, Primary Examiner

U.S. Cl. X.R.

267—65